United States Patent [19]
Wright, Jr. et al.

[11] 3,714,236
[45] Jan. 30, 1973

[54] PROCESS FOR PRODUCING MIXED ESTERS FROM ALDEHYDES

[75] Inventors: Howard N. Wright, Jr.; Hugh J. Hagemeyer, Jr., both of Longview, Tex.

[73] Assignee: Eastman Kodak Company, Rochester, N.Y.

[22] Filed: Aug. 7, 1970

[21] Appl. No.: 61,896

[52] U.S. Cl.............260/494, 252/429 A, 260/491, 260/499, 260/615 A, 260/638 C, 260/643 R
[51] Int. Cl.........................C07c 67/00, C07c 67/06
[58] Field of Search..............................260/494, 499

[56] References Cited

UNITED STATES PATENTS

| | | | |
|---|---|---|---|
| 3,081,344 | 3/1963 | Hagemeyer, Jr. et al. | 260/494 |
| 3,398,166 | 8/1968 | Duke et al. | 260/494 |

*Primary Examiner*—Vivian Garner
*Attorney*—Cecil D. Quillen, Jr. and Daniel B. Reece, III

[57] ABSTRACT

The Tischenko reaction is employed to produce mixed esters from acetaldehyde and isobutyraldehyde with maximum production of ethyl acetate, isobutyl acetate, and isobutyl isobutyrate, and minimum product of undesirable products such as ethyl isobutyrate. Isolation of essentially pure preferred ester products is achieved through a novel continuous distillation system. A holding tank maintained at an elevated temperature with respect to a Tischenko reactor is employed to increase the yield of preferred ester products. Distillation streams containing undesirable impurities and ethyl isobutyrate are cycled to a condensation catalyst reactor for use as catalyst solvent, and to effect conversion of ethyl isobutyrate to preferred ester products.

8 Claims, 2 Drawing Figures

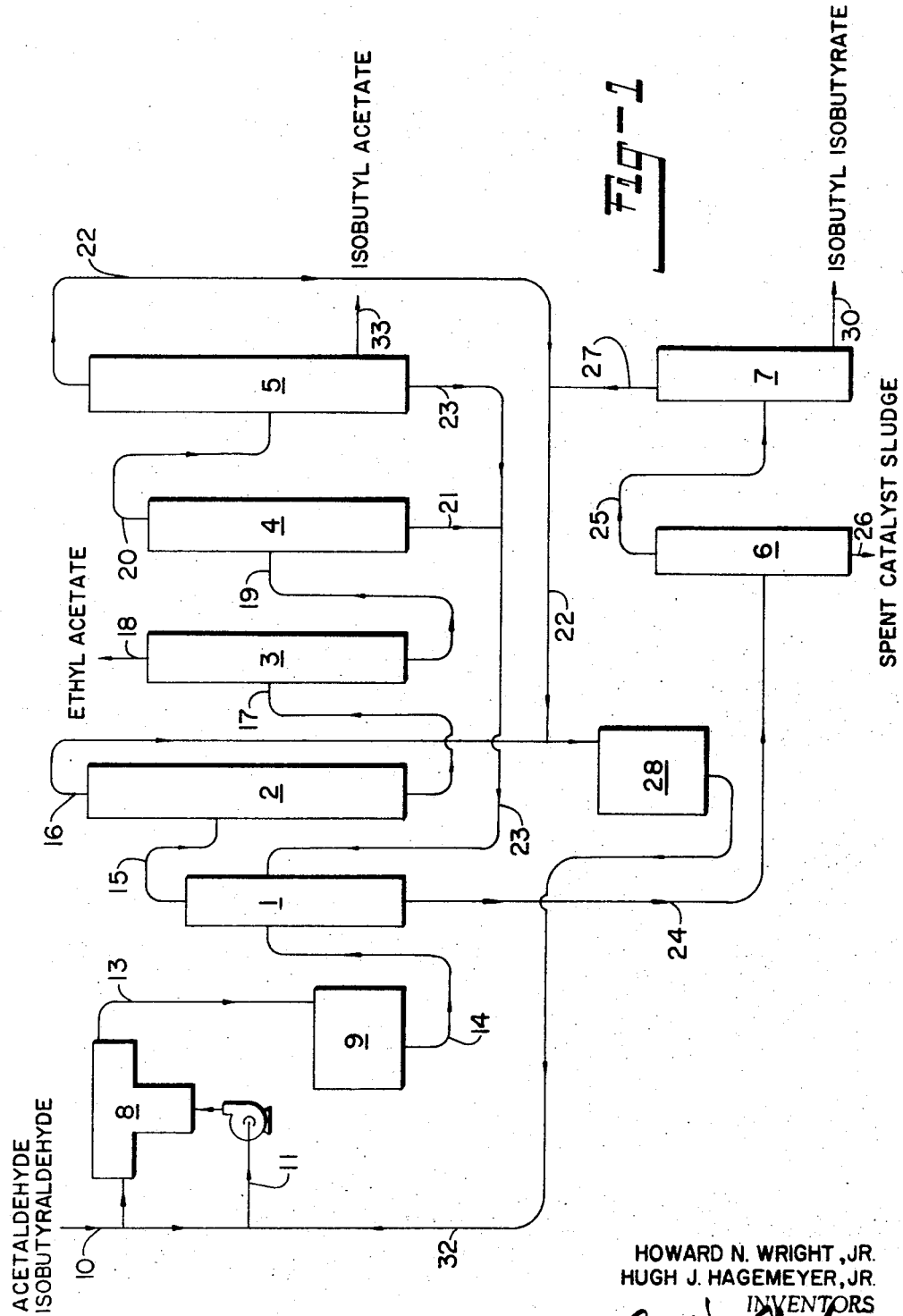

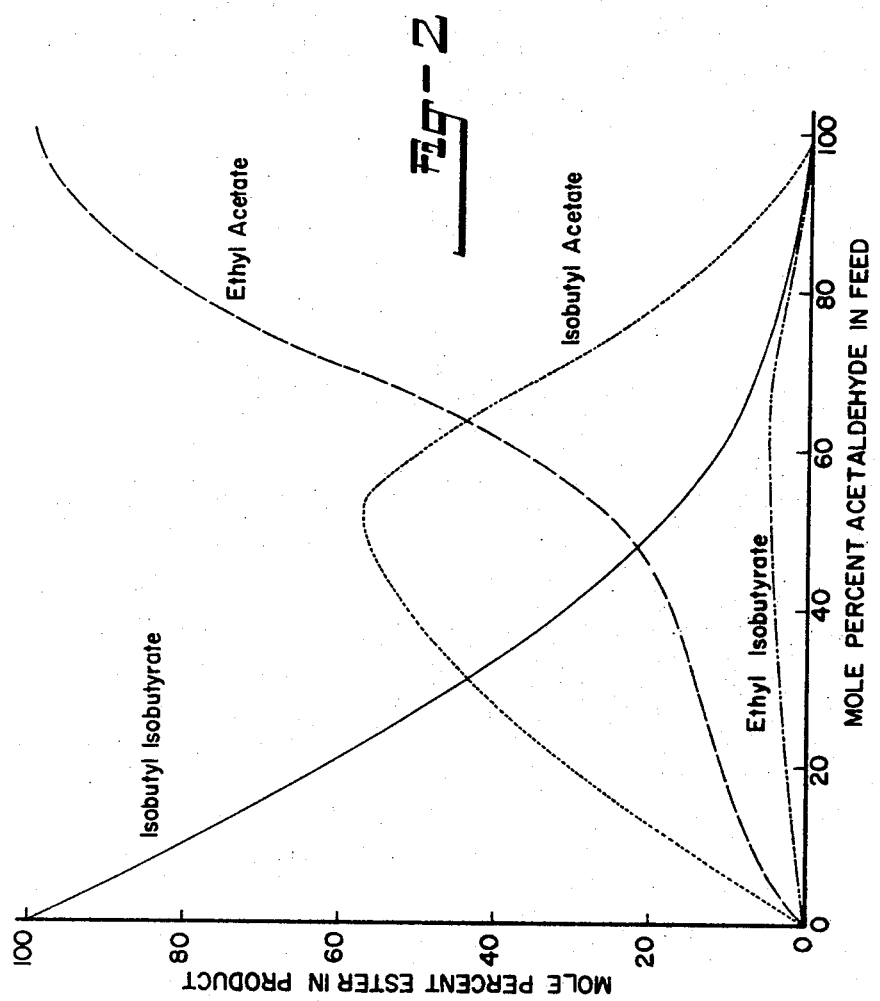

PROCESS FOR PRODUCING MIXED ESTERS FROM ALDEHYDES

This invention relates to the synthesis and recovery of mixed esters from mixed aldehydes by means of the Tischenko reaction. More particularly, the invention relates to a process for the preparation of mixed esters from acetaldehyde and iso-butyraldehyde and recovery of essentially pure ethyl acetate, isobutyl acetate and isobutyl isobutyrate.

The condensation of aldehydes by the well known Tischenko reaction, which may be written:

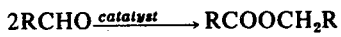

wherein R is an alkyl group and the catalyst is a metal alkoxide condensation catalyst such as aluminum alkoxide, has been used extensively to produce certain lower esters on an industrial scale. For example, ethyl acetate has been produced for a number of years by the process of reacting acetaldehyde in the presence of an aluminum ethoxide slurry.

One industrial process for reacting dissimilar aldehydes to produce esters comprises oxidizing an aldehyde to acid in one production unit, hydrogenating an aldehyde to alcohol in another production unit, and esterifying the resulting alcohol and acid in a third production unit. Such a three-step process has the disadvantage of requiring an excessive amount of expensive equipment. The use of the Tischenko reaction to produce mixed esters from dissimilar aldehydes has been reported, but has not heretofore been used on an industrial scale due to the difficulty in separating the ester products. Attempts to employ the Tischenko reaction to produce ester products from the reaction of acetaldehyde and isobutyraldehyde has heretofore resulted in a mixed ester product containing undesirable azeotropes and considerable amounts of ethyl isobutyrate. As is well known, ethyl isobutyrate has only very limited industrial importance due to its objectionable odor and when separated in a conventional distillation system tends to remain as a contaminant in the preferred ester products.

According to the present invention, a continuous process for the preparation and recovery of essentially pure esters from a Tischenko reaction of acetaldehyde and isobutyraldehyde free of alcohol azeotropes and ethyl isobutyrate contamination is disclosed. The process comprises introducing into a reaction zone essentially dry, acid-free reactants comprising a mixture of acetaldehyde and isobutyraldehyde, and condensing the reactants at a condensation temperature in the presence of a metal alkoxide condensation catalyst for a time sufficient to convert at least 90 percent of the reactants to a reaction product mixture comprising ethyl acetate, isobutyl acetate, isobutyl isobutyrate, and ethyl isobutyrate. The reaction product mixture and unconverted reactants are then passed from the reaction zone to a holding zone maintained at an elevated temperature. During residence in the holding zone, unconverted aldehydes are preferentially converted to the preferred ester products.

The resulting reaction product mixture then passes from the holding zone to a first distillation zone of the novel distillation system of the present invention. An overhead distillate stream is withdrawn from the first distillation zone and is fed into a second distillation zone. An overhead distillation stream and a bottom residual stream are withdrawn from the second distillation zone, the bottom residual stream passing to a third distillation zone. Essentially pure ethyl acetate is withdrawn from the third distillation zone as an overhead product stream while a bottom residual stream is withdrawn from the third distillation zone and passed to a fourth distillation zone. An overhead distillate stream and a bottom residual stream are withdrawn from the fourth distillation zone, the overhead distillate stream passing to a fifth distillation zone and the bottom residual stream returning to the first distillation zone. A side product stream consisting essentially of isobutyl acetate is withdrawn from the fifth distillation zone. Also withdrawn from the fifth distillation zone are an overhead distillate stream and a bottom residual stream, the bottom residual stream returning to the first distillation zone.

The bottom residual stream of the first distillation zone is passed to a sixth distillation zone, from which sixth distillation zone is withdrawn a catalyst sludge stream and an overhead distillate stream which is passed to a seventh distillation zone. A side product stream consisting essentially of isobutyl isobutyrate and an overhead distillate stream are withdrawn from the seventh distillation zone, the overhead distillate stream returning to the first distillation zone.

The overhead distillate streams of the second, fifth and seventh distillation zones are recycled to a metal alkoxide condensation catalyst formation zone. Ethyl isobutyrate is preferentially converted in the catalyst formation zone to the preferred ester products which can be recovered in the novel distillation system of the present invention.

The novel process of the present invention will be described in more detail by reference to the drawings wherein:

FIG. 1 is a schematic flow diagram of a preferred embodiment of the process; and FIG. 2 is a graph showing the product distribution obtained according to this invention.

Referring to FIG. 1, a catalyst solution comprising condensing amounts of a metal alkoxide condensation catalyst is supplied from a catalyst reaction zone or tank 28 via line 32 into circulating line 11 of reactor zone 8. A reactant mixture of essentially dry, acid-free acetaldehyde and isobutyraldehyde is simultaneously fed to the reaction zone 8 via feed line 10. Aluminum alkoxide is the preferred condensation catalyst employed in the process and a metal chloride promoter such as aluminum trichloride is normally also used. The molar ratio of the aluminum alkoxide to the metal chloride promoter such as, for example, aluminum trichloride, is between about 4:1 to about 14:1 with the preferred ratio being about 4.5:1 to about 7:1. The solvent for the catalyst is the overhead taken from distillation columns 2 and 5. This is highly desirable since it permits the use of all by-products of the reaction and ultimately results in the by-products being converted to salable esters. Normally, the solvent will contain from about 10 to about 20 percent, and preferably 15 percent, of the overhead from column 2 with the remainder being the overhead from column 5. The catalyst mixture is soluble in the Tischenko reactor product.

The reactant mixture passes along feed line 10 to the reaction zone 8 via circulating line 11. By maintaining the temperature of reaction zone 8 at from about 0° to about 10° C., allowing a reactant residence time of from about 3 to about 6 hours, and adjusting the aluminum alkoxide catalyst feed rate to from about 0.1 to about 5.0 percent by weight of the total feed, a conversion of at least 90 percent of the reactants is effected to yield a reaction product mixture comprising ethyl acetate, isobutyl acetate, isobutyl isobutyrate, and ethyl isobutyrate. The reactor overflow comprising the reaction product mixture and unconverted reactants is passed via line 13 to a circulating hold tank 9 maintained at a temperature of between about 20° C. to about 40° C., preferably about 30°C., and of such a size as to provide a residence time sufficient to complete preferential condensation of the unconverted reactants to the desired mixed ester products. The overflow from holding tank 9 passes to stripper column 1 via line 14.

The residence time necessary for the unconverted reactants to be preferentially condensed may vary somewhat dependent upon the temperature, catalyst concentration, etc., but normally will fall within the range of about 5 to about 30 hours. If the condensation of the unconverted reactants is not substantially completed prior to its being fed into stripper column 1 an excess amount of aldehydes will be fed into the distillation system. In the first two columns these excess aldehydes will react with isobutanol and ethanol to form acetals which break down in later columns to form water, low boilers which boil below 70° C. at atmospheric pressure and other undesirable products. The presence of the undesirable products in turn results in the base heaters of the columns 1 and 6 being plugged and the whole system, including products, being contaminated with decomposition products.

The effectiveness of the holding tank 9 in preventing the entry of unconverted reactants into column 1 is clearly illustrated in Table I wherein the percent (by weight of the total feed) of unreacted aldehydes fed into the holding tank via line 13 is compared to the weight percent aldehydes discharged from the tank through line 14. The hold time of the tank is 16 hours at approximately 30°C.

TABLE I

Weight Percent (by weight of total feed) Unreacted Aldehydes in

| Reactor Overflow (line 13) | Hold Tank Discharge (line 14) |
|---|---|
| 3.5% | 0.3% |
| 4.9% | 0.5% |
| 5.5% | 0.5% |
| 5.9% | 1.0% |
| 8.0% | 1.3% |
| 10.0% | 1.8% |

The stripper column 1 overhead distillate stream comprising ethyl acetate, ethyl isobutyrate, isobutyl acetate and other low boiling fractions passes via line 15 to distillation column 2. The overhead distillate stream from column 2 comprising aldehydes, ethanol, and small quantities of ethyl acetate is withdrawn via line 16, and advantageously passed via line 22 to catalyst reactor 28. The bottom residual stream from column 2 is fed via line 17 to distillation column 3. The overhead product stream of column 3 comprising essentially pure ethyl acetate is drawn off via line 18 and collected as a product while the bottom residual stream from column 3 passes via line 19 to distillation column 4. The overhead distillate stream from column 4 passes via line 20 to distillation column 5 while the bottom residual stream is recycled to column 1 via lines 21 and 23. The overhead distillate stream of column 5 is drawn off via line 22 and, advantageously, this stream may be returned to the catalyst reactor 28. The side product stream from column 5 consisting essentially of pure isobutyl acetate is drawn off via line 33 and collected as a product.

The bottom residual stream from column 1 passes via line 24 to distillation column 6. The overhead distillate stream from column 6 is passed via line 25 to distillation column 7 while the bottom stream comprising spent catalyst sludge is drawn off via line 26. The overhead distillate stream from column 7 comprising isobutanol and other low boiling components is drawn off via line 27 and returned to the catalyst reactor 28. The side product stream from column 7 consisting of essentially pure isobutyl isobutyrate is drawn off via line 30 and collected as a product.

Table II illustrates the temperature and pressure ranges under which the columns are operated.

TABLE II

| Column | Temperature* at Top of Column Maximum | Minimum | Preferred | Pressure |
|---|---|---|---|---|
| 1 | 117° C. | 78° C. | ** | Approximately atmospheric |
| 2 | 78° C. | 60° C. | 70–72° C. | Atmospheric to 100 psig |
| 3 | 77° C. | 77° C. | 77° C. | Approximately atmospheric |
| 4 | 117° C. | 108° C. | 113° C. | Approximately atmospheric |
| 5 | 117° C. | 108° C. | 114° C. | Approximately atmospheric |
| 6 | 150° C. | 145° C. | 147° C. | 50 mm Mercury to atmospheric |
| 7 | 147° C. | 108° C. | 120° C. | 100 mm Mercury to atmospheric |

*Stated temperatures are for operation at atmospheric pressure.
**Depends upon desired ratio of products being produced.

The following examples illustrate more fully the processes of the present invention whereby mixed esters are produced from isobutyraldehyde and acetaldehyde with a minimum production of ethyl isobutyrate, and recovered as essentially pure ester products free of ethyl isobutyrate and azeotropic contamination. In the examples, numerals designating process equipment such as reactors, distillation columns, etc., are those of FIG. 1.

EXAMPLE I

One-thousand sixty pounds per day of dry acetaldehyde, 1,380 pounds per day of dry isobutyraldehyde and a catalyst solution containing 6.0 moles of aluminum alkoxide per mole of anhydrous aluminum chloride sufficient to provide 0.20 percent aluminum based on total feed, are added to a 100 gallon capacity Tischenko reactor 8. Reactor temperature is maintained at 5° C. and reactor residence time is 4 hours. Aluminum alkoxide feed rate to the Tischenko reactor 8 is adjusted to maintain less than 5 percent unreacted aldehydes in the reactor overflow. Overflow from the Tischenko reactor 8 is introduced into a circulating 1000 gallon capacity hold tank 9, the level of which is maintained at about 500 gallons to provide a 24 hours residence time. The temperature of the material in the hold tank is kept at about 30° C.

The hold tank 9 overflow, which consists of a reaction product mixture comprising 0.2 percent acetaldehyde, 0.3 percent isobutyraldehyde, 23.9 percent ethyl acetate, 7.1 percent ethyl isobutyrate, 48.4 percent isobutyl acetate, 18.0 percent isobutyl isobutyrate, 0.2 percent acetals and 1.9 percent catalyst and glycol esters, is introduced from the hold tank via line 14 to stripper column 1. Column 1 is operated at atmospheric pressure to separate isobutyl acetate and lower boiling components overhead. Temperatures along the column average 112° C. at the top, 120° C. at the middle, 145° C. at the bottom and 152° C. in the base heater. Reflux ratio is maintained at a value greater than 4 to 1.

Stripper column 1 overhead distillate stream is fed into aldehyde distillation column 2 via line 15. Column 2 is operated at atmospheric pressure to separate aldehyde, ethyl alcohol and some ethyl acetate overhead. Temperatures along column 2 average 71° C. at the top, 83° C. at the middle, 85° C. at the base, and 111° C. in the base heater. Reflux ratio is maintained at a value greater than 20 to 1. Column 2 overhead distillate stream is drawn off at a rate of 101 pounds per day of low boilers via line 16. Column 2 residual stream is fed into ethyl acetate distillation column 3 via line 17. Distillation column 3 is operated at atmospheric pressure to separate pure ethyl acetate overhead. Temperatures along the column average 77° C. at the top, 80° C. at the middle, and 120° C. in the base heater. Reflux ratio is maintained at the value greater than 5 to 1. An overhead distillate product stream comprising 99.9 percent ethyl acetate is drawn off column 3 via line 18 at a rate of 504 pounds per day.

The bottom residual stream of column 3 is fed via line 19 to distillation column 4. This column is operated at atmospheric pressure to separate the lower boiling components from isobutyl isobutyrate. Temperature along the column average 113° C. at the top, 120° C. at the middle, and 123° C. in the base heater. Reflux ratio is maintained at a value greater than 3 to 1. The bottom residual stream of column 4 is recycled to stripper column 1 via lines 21 and 23 at a rate of 10 pounds per hour to insure the absence of isobutyl isobutyrate in distillation column 5. The overhead distillate stream of column 4 is transferred via line 20 into isobutyl acetate distillation column 5. This column is operated at atmospheric pressure to separate ethyl acetate, isobutanol and ethyl isobutyrate from isobutyl acetate. Temperatures along the column average 114° C. at the top, 113° C. at the middle, 132° C. at the base, and 148° C. in the base heater. Reflux ratio is maintained at a value greater than 5 to 1. Column 5 overhead distillate stream is drawn off via line 22 at a rate of 560 pounds per day of low boiling components; the take-off rate is adjusted to provide enough isobutyl acetate to equal the rate of ethyl isobutyrate in the overhead product. A side product stream consisting of 99.9 percent isobutyl acetate vapor is withdrawn from column 5 via line 33 at a rate of 1186 pounds per day. A bottom residual stream is drawn off column 5 via line 23 and is recycled to distillation column 1 at a rate of 10 pounds per hour to insure the absence of acetals in the base of column 5.

The bottom residual stream of column 1 is fed via line 24 into catalyst stripper column 6. This column operated at atmospheric pressure to separate isobutyl isobutyrate from glycol esters and catalyst residue. Temperatures along the column average 147° C. at the top, 150° C. at the middle, and 250° C. in the base heater. Reflux ratio is maintained at a value greater than 1 to 1. A molten catalyst sludge stream comprising glycol esters and catalyst residue is removed from the base of column 6 via line 26. The overhead distillate stream of column 6 is fed via line 25 into isobutyl isobutyrate distillation column 7.

Column 7 is operated at atmospheric pressure to separate isobutanol and other low boiling components from isobutyl isobutyrate. Temperatures along the column average 120° C. at the top, 150° C. at the middle, and 158° C. in the base heater. An overhead distillate stream is withdrawn at a rate of 10 pounds per hour and returned to catalyst reactor 28 via lines 27 and 22 to insure the absence of isobutanol and low boilers in the isobutyl isobutyrate product. A side product stream consisting essentially of 99.9 percent isobutyl isobutyrate is withdrawn from the base of column 7 via line 30 at a rate of 500 pounds per day. A bottom residual stream may be recycled to column 6 at a rate of 10 pounds per hour to insure the absence of high boiling components in the base of column 7.

This example illustrates the operation of the process with 43.5 percent acetaldehyde in the aldehyde feed mixture. A change in the aldehyde feed mixture produces corresponding changes in the quantities removed from each distillation column as clearly illustrated in the following example.

EXAMPLE II

Mixed esters are synthesized according to the continuous process of Example I. The Tischenko reactor is operated at 4° to 6° C. with reactor residence time at 3.8 to 4.0 hours, and with sufficient aluminum alkoxide catalyst solution to provide 0.2 percent aluminum, based on total reactor feed. The catalyst solution contains 5.0 moles of aluminum alkoxide per mole of aluminum chloride. Duplicate runs are made with 6 aldehyde feed mixtures containing from 20 percent acetaldehyde and 80 percent isobutyraldehyde to 75 percent acetaldehyde and 25 percent isobutyraldehyde. Reactor overflow is found to contain 2 to 6 percent unreacted aldehyde, which decreases to 0.1 to 0.3 percent unreacted aldehyde after standing 15 hours at 25° C. in a hold tank. FIG. 2 graphically illustrates the ester product distribution with respect to percent acetaldehyde in the aldehyde feed mixture, corrected for catalyst solvent.

FIG. 2 shows an entirely unexpected product distribution. Acetaldehyde is preferentially converted to the acetate group rather than the ethyl group, while isobutyraldehyde is preferentially converted to the isobutyl group rather than the isobutyrate group. A purely random product distribution would produce a symmetrical isobutyl acetate curve with a maximum at about 25 percent and the ethyl isobutyrate curve would have been superimposed on the isobutyl acetate curve. Also, the isobutyl isobutyrate and ethyl acetate curves would have been mirror images of each other.

EXAMPLE III

The overhead distillate streams of aldehyde distillation column 2 and isobutyl acetate distillation column 5 of Example I are transferred via lines 16 and 22 respectively to a catalyst reactor 28. The typical composition of the overhead distillate stream of column 2 is about 0.2 percent water, 6.6 percent acetaldehyde, 5.9 percent isobutyraldehyde, 0.3 percent low boilers, 1.1 percent ethanol, and 85.9 percent ethyl acetate. The composition of the over-head distillate stream of column 5 is 8.3 percent ethyl acetate, 38.9 percent ethyl isobutyrate, 3.0 percent and 48.8 percent is butyl acetate.

Jacketed catalyst reactor 28 is charged with 225 pounds of material from the previous catalyst reactor batch, 303 pounds of column 2 overhead distillate, 1680 pounds of column 5 over-head distillate, 240 pounds isobutanol and 50 pounds of aluminum metal turnings. The reaction between aluminum and isobutanol is initiated by heating the mixture to about 70° C. Heat of reaction is removed by vaporizing the solvent esters, condensing the vaporized esters and returning the solvent esters as reflux. Additional cooling needed during the first part of the reaction is provided through the reactor jacket. When the reaction nears completion, the reaction mixture is cooled to about 50° C. and 12 pounds of vaporized chlorine is introduced into the bottom of the catalyst reactor during a 4 hour period. A reaction mixture is then heated to provide gentle refluxing for 8 to 12 hours.

Typical aluminum alkoxide catalyst solution contains 0.5 to 1.0 percent unreacted alcohol, 1.57 percent aluminum chloride, 3.77 percent aluminum ethoxide, 8.23 percent aluminum isobutoxide, 19.5 percent ethyl acetate, 0.6 percent low boilers, 9.8 percent ethyl isobutyrate, 36.6 percent isobutyl acetate and 19.4 percent isobutyl isobutyrate. The conversion of ethyl isobutyrate to other esters is 65.6 mole percent.

Advantageously, the conversion of ethyl isobutyrate to other esters can be raised to 80 to 90 mole percent when column 5 distillate alone is used as a catalyst solvent. This modification of the process illustrated in FIG. 1 can be accomplished by disconnecting overhead line 16 of column 2 from the catalyst reactor 28. If desirable, the catalyst solution from reactor 28 may be passed through a flash column to remove low boiler before it is fed to the reactor. The overhead from column 2 is discharged from the process.

EXAMPLE IV

As discussed hereinabove, the hold tank is necessary to the process since any unreacted aldehydes entering the distillation react with alcohols to produce acetals and water. These acetals in turn decompose on heating to produce alcohols and unsaturated ethers which are contaminants in the product esters. To illustrate the necessity of the hold tank the continuous system of Example I is modified to remove the hold tank 9. Thus, the overflow from the Tischenko reactor is introduced directly into stripper column 1 The bottom residual stream of column 3 is fed into column 5 and the bottom residual stream of column 5 is fed into column 4 from which is removed an overhead distillate product stream of isobutyl acetate. The Tischenko reactor is operated at 2° C. with 44.5 percent acetaldehyde and 55.4 percent isobutyraldehyde in the aldehyde feed mixture. The residence time of the reactor is 5 hours and aluminum alkoxide catalyst concentration is 0.7 percent, based on total weight, as aluminum.

The overflow material from the reactor contains 4.5 percent unreacted aldehydes. The overhead distillate material from column 2 contains 5 to 6 percent water and 20 to 25 percent aldehydes. The overhead distillate material from column 4 contains 0.3 percent acetals, 5.0 percent isobutanol and unsaturated ethers and 94.7 percent isobutyl acetate. The bottom residual stream of column 4 contains 0.3 percent unsaturated ethers, 76.1 percent isobutyl acetate and 23.6 percent acetals. The overhead distillate of column 6 contains 3.8 percent acetals with the remainder being isobutyl isobutyrate.

EXAMPLE V

Mixed esters are synthesized according to the continuous process of Example IV except that a hold tank with a capacity of 24 hours residence time is added between the Tischenko reactor and distillation column 1. The Tischenko reactor overflow product contains 4.5 percent unreacted aldehyde which is decreased to 1.5 percent aldehyde in the hold tank. The overhead distillate material from column 2 contains less than 1 percent water and 12.5 percent aldehydes. The overhead distillate material from column 4 contains 95.8 percent isobutyl acetate, 1.4 percent acetals and 2.8 percent isobutanol and unsaturated ethers. The bottom residual stream of column 4 contains 96.0 percent isobutyl acetate, 2.6 percent acetals and 1.4 percent unsaturated ether. The overhead distillate of column 6 contained pure isobutyl isobutyrate with only trace amounts of impurities.

The above examples demonstrate that the novel process of the present invention avoids the prior art difficulties inherent in the use of the mixed Tischenko reaction to produce mixed esters of acetaldehyde and isobutyraldehyde. The present process results in essentially pure recovery of maximum amounts of ethyl acetate, isobutyl acetate, and isobutyl isobutyrate free of azeotropes and ethyl isobutyrate contamination, while unexpectedly concentrating the impurities and ethyl isobutyrate in the column 2 and column 5 overhead streams. The process advantageously employs the undesirable ethyl isobutyrate-rich stream in such a manner as to assist in condensation catalyst formation while converting the undesirable ethyl isobutyrate to other valuable esters. In addition, the use of a holding tank maintained at an elevated temperature of from about 20° to 40° C. in a preferred embodiment of the present process allows preferential conversion of unreacted aldehydes to the desired ester products, thereby increasing the yield of the valuable ester products.

It will be evident to those skilled in the art that variations in the distillation columns can be made in the present process, with corresponding changes in the number of plates in each column, reflux ratios, etc. For instance, further examples could be given to show that catalyst stripper column 6 of the example can be replaced by a steam distillation column or an acid wash column. Any such variations, however, must include a drying column, an isobutanol column, and an isobutyl isobutyrate column in the system.

The invention has been described in detail with particular reference to certain preferred embodiments thereof, but it will be understood that variations and modifications can be effected within the spirit and scope of the invention.

We claim:

1. A continuous process for the preparation and recovery of essentially pure esters from acetaldehyde and isobutyraldehyde essentially free of ethyl isobutyrate contaminant which comprises:

1. introducing into a reaction zone essentially dry, acid-free reactants comprising a mixture of acetaldehyde and isobutyraldehyde, condensing said reactants at a condensation temperature of about 0°–10 C in the presence of an aluminum alkoxide condensation catalyst for about 3 to 6 hours to convert at least 90 percent of said reactants to a reaction product mixture comprising ethyl acetate, isobutyl acetate, isobutyl isobutyrate, and ethyl isobutyrate
   2. passing said reaction product mixture and unconverted reactants to a holding zone maintained at a temperature of between about 20° C. to about 40° C. for about 5 to 30 hours to substantially complete condensation of said unconverted reactants;
   3. passing the resulting reaction product mixture of said holding zone to a first distillation zone maintained at about atmospheric pressure with a top temperature of from about 78° C. to about 117° C., withdrawing therefrom an overhead distillate stream comprising aldehydes, ethyl isobutyrate, ethyl acetate, isobutyl acetate, isobutanol and low boiling impurities and a bottom residual stream comprising isobutanol, isobutyl isobutyrate, glycol esters and catalyst residue, passing said overhead distillate stream to a second distillation zone maintained at from about atmospheric to about 100 psig pressure with a top temperature of from about 60° C. to about 78° C. at atmospheric pressure;
   4. withdrawing from said second distillation zone an overhead distillate stream comprising aldehydes, ethyl acetate, and low boiling impurities and a bottom residual stream comprising ethyl acetate, isobutyl acetate and high boiling impurities, passing said bottom residual stream to a third distillation zone maintained at about atmospheric pressure with a top temperature of about 77° C.;
   5. withdrawing from said third distillation zone an overhead distillate product stream consisting essentially of ethyl acetate and a bottom residual stream comprising isobutyl acetate and high boiling impurities, passing said bottom residual stream to a fourth distillation zone maintained at about atmospheric pressure with a top temperature of from about 108° C to about 117° C.;
   6. withdrawing from said fourth distillation zone an overhead distillate stream comprising isobutyl acetate and low boiling impurities and a bottom residual stream comprising isobutyl acetate and high boiling impurities, passing said overhead distillate stream to a fifth distillation zone maintained at about atmospheric pressure with a top temperature of from about 108° C. to about 117° C. and returning said bottom residual stream to said first distillation zone;
   7. withdrawing from said fifth distillation zone an overhead distillate stream comprising isobutyl acetate and low boiling impurities, a side product stream consisting essentially of isobutyl acetate, and a bottom residual stream comprising isobutyl acetate, acetals and high boiling impurities; returning said bottom residual stream to said first distillation zone;
   8. passing said bottom residual stream of said first distillation zone to a sixth distillation zone maintained at from about 50 mm mercury to about atmospheric pressure with a top temperature of from about 145° C. to about 150° C. at atmospheric pressure;
   9. withdrawing from said sixth distillation zone a bottom catalyst sludge stream comprising glycol esters and catalyst residue and an overhead distillate stream comprising isobutyl isobutyrate and isobutanol, passing said overhead distillate stream to a seventh distillation zone maintained at from about 100 mm mercury to about atmospheric pressure with a top temperature of about 108° C. to about 147° C. to atmospheric pressure; and
   10. withdrawing from said seventh distillation zone an overhead distillate stream comprising isobutanol and low boiling impurities and a side product stream consisting essentially of isobutyl isobutyl isobutyrate.

2. A process according to claim 1 wherein the overhead distillate stream from said seventh distillation zone is fed to an aluminum alkoxide condensation catalyst formation zone wherein an alkanol, halogen and aluminum metal are introduced to form an aluminum alkoxide condensation catalyst, a solution of aluminum alkoxide condensation catalyst is withdrawn from said condensation catalyst formation zone and said solution of aluminum alkoxide condensation catalyst is passed to said reaction zone.

3. A process according to claim 1 wherein the overhead distillate stream from said fifth distillation zone is fed to an aluminum alkoxide condensation catalyst formation zone wherein an alkanol, halogen and aluminum metal are introduced to form an aluminum alkoxide condensation catalyst, a solution of aluminum alkoxide condensation catalyst is withdrawn from said condensation catalyst formation zone and said solution of aluminum alkoxide condensation catalyst is passed to said reaction zone.

4. A process according to claim 3 wherein said aluminum alkoxide condensation catalyst formation zone is maintained at a temperature of between about 110° C. and about 130° C.

5. A process according to claim 1 wherein the overhead distillate stream from said second distillation zone is fed to an aluminum alkoxide condensation catalyst formation zone wherein an alkanol, halogen and aluminum metal are introduced to form an aluminum alkoxide condensation catalyst, a solution of aluminum alkoxide condensation catalyst is withdrawn from said condensation catalyst formation zone and said solution of aluminum alkoxide condensation catalyst is passed to said reaction zone.

6. A process according to claim 1 wherein the overhead distillate streams from said second, fifth and seventh distillation zones are fed to an aluminum alkoxide condensation catalyst formation zone wherein an alkanol, halogen and aluminum metal are introduced to form an aluminum alkoxide condensation catalyst, a solution of aluminum alkoxide condensation catalyst is withdrawn from said condensation catalyst formation zone and said solution of aluminum alkoxide condensation catalyst is passed to said reaction zone.

7. A process according to claim 1 wherein said holding zone is maintained at an elevated temperature of about 30° C.

8. A process according to claim 1 wherein said aluminum alkoxide condensation catalyst is fed into said reaction zone at a rate of about 0.1 to about 5.0 percent by weight of the total reactants.

* * * * *

UNITED STATES PATENT OFFICE
CERTIFICATE OF CORRECTION

Patent No. 3,714,236      Dated January 30, 1973

Inventor(s) Howard N. Wright, Jr., Hugh J. Hagemeyer, Jr.

It is certified that error appears in the above-identified patent and that said Letters Patent are hereby corrected as shown below:

In the abstract, line 5, the first word should be ---production---, not "product".

Column 5, line 2, "24 hours" should be ---24 hour---.

Column 7, line 13, delete "3.0 percent and 48.8. percent is butyl acetate." and insert ---3.0 percent isobutanol and 48.8 percent isobutyl acetate.---

Column 7, line 61, after "column 1", insert a period (.).

Column 9, line 15, delete "0°-10 C" and insert ---0°-10°C.---.

Column 9, line 21, after "isobutyrate", insert a semicolon (;).

Column 10, line 23, delete "to" and insert ---at---.

Column 10, line 27, delete the second "isobutyl".

Signed and sealed this 10th day of July 1973.

(SEAL)
Attest:

EDWARD M. FLETCHER, JR.
Attesting Officer

Rene Tegtmeyer
Acting Commissioner of Patents